United States Patent [19]
Boezeman et al.

[11] Patent Number: 6,108,010
[45] Date of Patent: *Aug. 22, 2000

[54] METHOD AND SYSTEM FOR A TRUE-SCALE MOTION PATH EDITOR

[75] Inventors: John Junior Boezeman, Cary; Christopher Joseph Paul, Durham, both of N.C.

[73] Assignee: International Business Machines Corp., Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/896,817

[22] Filed: Jul. 18, 1997

[51] Int. Cl.⁷ .................................................. G06T 13/00
[52] U.S. Cl. ............................................ 345/438; 345/474
[58] Field of Search ................................... 345/433, 438, 345/473–475

[56] References Cited

U.S. PATENT DOCUMENTS

| | | | |
|---|---|---|---|
| 3,637,212 | 1/1972 | Hurley | 273/85 R |
| 5,261,041 | 11/1993 | Susman | 395/152 |
| 5,355,314 | 10/1994 | Feigenbaum | 364/420 |
| 5,425,139 | 6/1995 | Williams et al. | 395/152 |
| 5,510,995 | 4/1996 | Oliver | 364/474.24 |
| 5,572,639 | 11/1996 | Gantt | 395/133 |
| 5,577,185 | 11/1996 | Tunnell et al. | 395/173 |
| 5,594,856 | 1/1997 | Girard | 395/173 |
| 5,619,628 | 4/1997 | Fujita et al. | 395/127 |
| 5,678,001 | 10/1997 | Nagel et al. | 395/173 |
| 5,680,619 | 10/1997 | Gudmundson et al. | 395/701 |
| 5,692,144 | 11/1997 | Thrush | 395/339 |
| 5,758,180 | 5/1998 | Duffy et al. | 395/806 |
| 5,767,861 | 6/1998 | Kimura | 345/473 |
| 5,793,382 | 8/1998 | Yerazunis et al. | 345/474 |
| 5,818,462 | 10/1998 | Marks et al. | 345/473 |
| 5,943,056 | 8/1999 | Sato et al. | 345/419 |

FOREIGN PATENT DOCUMENTS

| | | | |
|---|---|---|---|
| 0309373 | 3/1989 | European Pat. Off. | |
| 0709771 | 10/1995 | European Pat. Off. | |
| 06096186 | 8/1994 | Japan | G06F 15/62 |
| 2258790 | 12/1991 | United Kingdom | |
| 2303282 | 10/1993 | United Kingdom | |

OTHER PUBLICATIONS

"Animated Software Documentation" IBM Technical Disclosure Bulletin. vol. 34, No. 10A Mar. 1, 1992, pp. 27–28.
Tutorial 12: Curves and Controllers; *3–D Studio Max Tutorials,* Autodesk, Inc., pp. 12–19 to 12–26 (Mar. 1996).
Chapter 19: Shaping Objects, *Corel Draw4 User Manual,* Corel Corporation, p. 118 (1993).

*Primary Examiner*—Almis R. Jankus
*Attorney, Agent, or Firm*—A. Bruce Clay; Myers Bigel, Sibley & Sajovec, P.A.

[57] ABSTRACT

A movement path is defined for a multimedia object in an application development environment. A multimedia object is placed in a layout area of the application development environment. A movement path is then specified within the layout area for the object using a pointing device. The object may either be dragged along the movement path by the pointing device or individual points may be selected with the pointing device to define the movement path. Once the path has been defined, the path may be easily modified. The user may add or delete points by simply selecting a point with the pointing device for addition or deletion. In addition, the user may combine two or more movement paths into one.

15 Claims, 9 Drawing Sheets

METHOD AND SYSTEM FOR A TRUE-SCALE MOTION PATH EDITOR

CROSS REFERENCE TO RELATED APPLICATIONS

This Application is related in subject matter to the following Applications filed concurrently herewith and assigned to a common Assignee:

Application Ser. No. 08/896,817 filed by Boezeman, et al., entitled "Method and System for a True-Scale Motion Path Editor to Create Motion Paths as Independent Entities"; application Ser. No. 80/896,648 filed by Boezeman, et al., entitled "Method and System for a True-Scale Motion Path Editor Using Time Segments, Duration and Synchronization"; and application Ser. No. 08/896,818 filed by Boezeman, et al., entitled "Method and System for a True-Scale Motion Path Editor Using Proximity Detection/Reaction and Event Generation".

The foregoing applications are incorporated herein by reference.

FIELD OF THE INVENTION

This invention relates in general to computer software, and in particular to a method and system for defining the movement path of a multimedia object in an application development environment.

BACKGROUND OF THE INVENTION

In a multimedia application development environment, users often want to assign a path along which the part will move to give the application special effects. For example, a user might want to display an animation of a bird appearing on the left edge of a page and flying across the page to exit on the right side of the page. Using the known techniques, the assignment of a motion path to a part is tedious. In addition, the known techniques have limited flexibility and require construction separate from the part layout area. Once constructed, it is difficult to modify the path.

One type of path definition is found in, for example, Premier by Adobe. To construct a path for an object/part, the user must exit the layout area and enter a separate window. Then, the user can draw a path for the part using a pointing device. There is no one-to-one scale and the path is drawn without the perspective of the actual environment including lack of true-scale surrounding parts. Thus, the user must create the path and then assign it, return to the layout area and run a test. If the path does not work as expected, the user must return to the separate path definition window and try again. This is awkward and time consuming, especially in complex layouts.

Another type of path definition can be found in Director by Macromedia. This type of path definition allows the use of the actual layout area for construction but also requires the use of a "score" area. The user must drag the part to the start time in the score. Then the user must drag the part to the next movement position in the layout are followed by another dragging to the score area for the time it should appear in that position. Once these steps have occurred from start point to finish point, the score area is highlighted and the placement is made on the layout area. Thus, this method can also be slow and tedious.

Thus, there is a need for a method and system for path definition that is quick and easy to use, especially for complex arrangements of multiple parts of any type using multiple paths.

SUMMARY OF THE INVENTION

The present invention disclosed herein comprises a method and system for defining a movement path of a multimedia object which greatly reduces problems associated with the prior art. The present invention allows the creation and modification of a movement path without the need for a separate path dialog.

In accordance with one aspect of the present invention, a movement path is defined for a multimedia object in an application development environment. A multimedia object is placed in a layout area of the application development environment. A movement path is then specified within the layout area for the object using a pointing device. The object may either be dragged along the movement path by the pointing device or individual points may be selected with the pointing device to define the movement path.

Once the path has been defined, the path may be easily modified. The user may add or delete points by simply selecting a point with the pointing device for addition or deletion. In addition, the user may combine two or more movement paths into one.

The present invention provides the technical advantage of being able to simply and intuitively create and modify a movement path for a multimedia object in an application development environment. Previously created and stored paths may be reused and or added to newly created paths, thus, providing greater flexibility for the developer.

BRIEF DESCRIPTION OF THE DRAWINGS

For a more complete understanding of the present invention and for further advantages thereof, reference is now made to the following Detailed Description taken in conjunction with the accompanying drawings, in which.

DETAILED DESCRIPTION OF THE INVENTION

Figure 1:
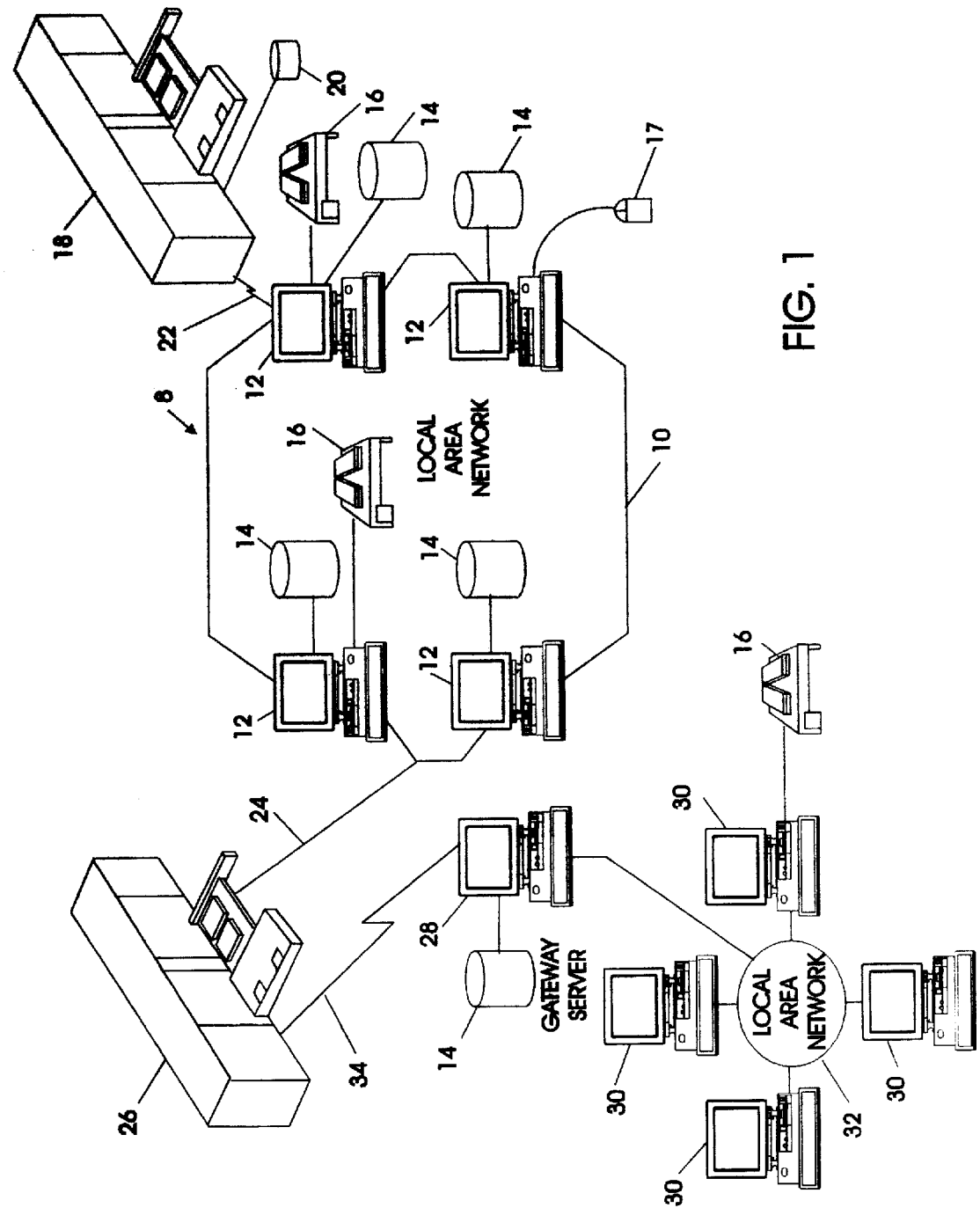
FIG. 1 is a pictorial representation of a data processing system which may be utilized to implement a method and system of the present invention.

Referring to FIG. 1, there is depicted a graphical representation of a data processing system 8, which may utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects maybe stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

Figure 2:
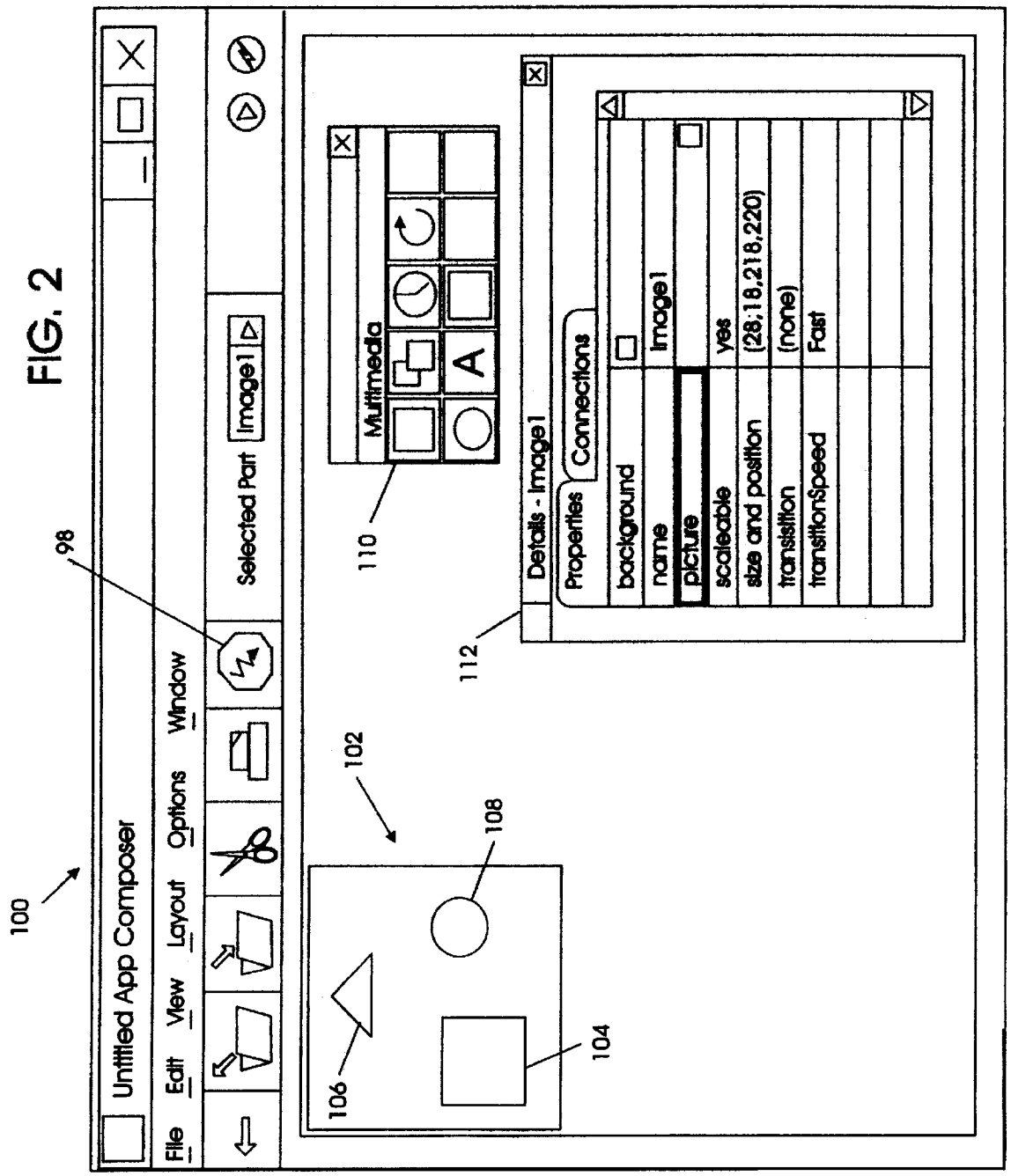
FIG. 2 is a graphical representation of a multimedia parts editor.

Referring to FIG. 2, a graphical representation of a multimedia part editor is shown in window 100. Within the part editor 100 there appears a layout area, generally indicated by reference numeral 102, in which a plurality of multimedia objects/parts, for example, square 104, triangle 106 and circle 108, are positioned for manipulation. A palette window 110 and a Details window 112 are also provided. The palette window 110 contains a collection of parts available for use in the current application being developed. These may include multimedia parts(image, sound, animation, etc) and/or controls (buttons, labels, listboxes, etc).

The Details window 112 is used to modify and customize the specific parts used in the current application and add logic between parts. A Properties tab 113 in the Details window 112 provides a method to modify the parts by allowing the user to customize specific characteristics of parts in the current application. For example, the picture property of an image part can be any source file (in the correct format) that the user desires. A Connections tab 115 of the Details window 112 provides a method to add logic between parts in the "part, event—part, action/property" format. For example, a user can add logic between a button and a sound file so that when the button is clicked, the sound file will play. This connection would read: "button clicked-sound play".

Figure 3:
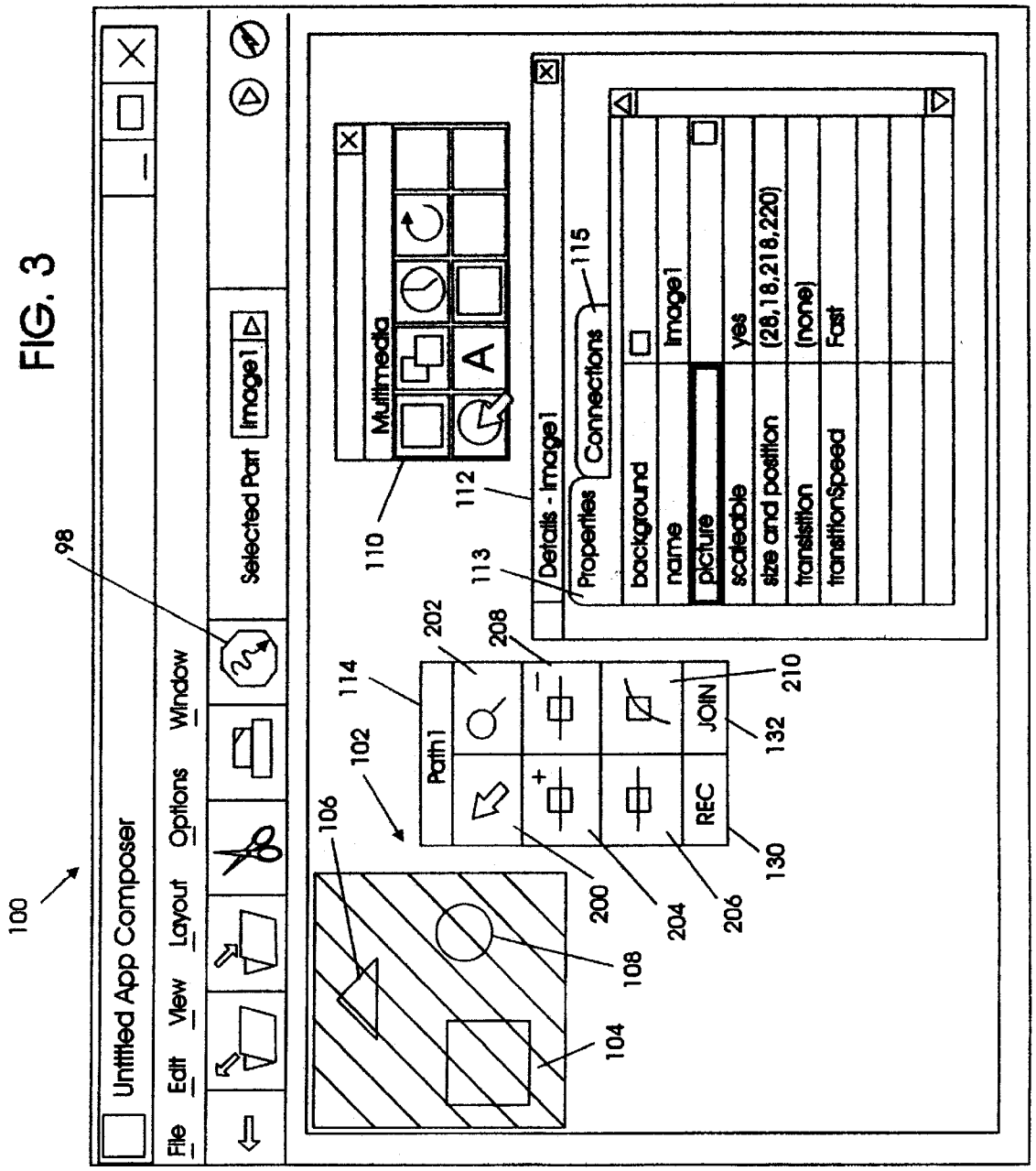
FIGS. 3,4 and 5 are graphical representations of the multimedia editor of FIG. 1 utilizing a path editor in accordance with the present invention.

Referring to FIG. 3, upon pressing a motion path button 98 on a main toolbar or by selecting "Motion Path Editor" (not shown) via an appropriate menu choice, a path editor window 114 appears adjacent to the layout area 102. A part specific path can also be created by first selecting a part to apply the path to and then pressing the motion path button 98 on the main toolbar or by selecting "Motion Path Editor" via the appropriate menu choice. The path window 114 is provided with a plurality of buttons and tools (which will be subsequently described in greater detail), including a "Record" push-button 130 and a "Join" push-button 132. In addition, all the parts/images within the layout area 102 are slightly ghosted when the motion path window 114 is first displayed, as indicated by the diagonal lines appearing therethrough.

Figure 4:
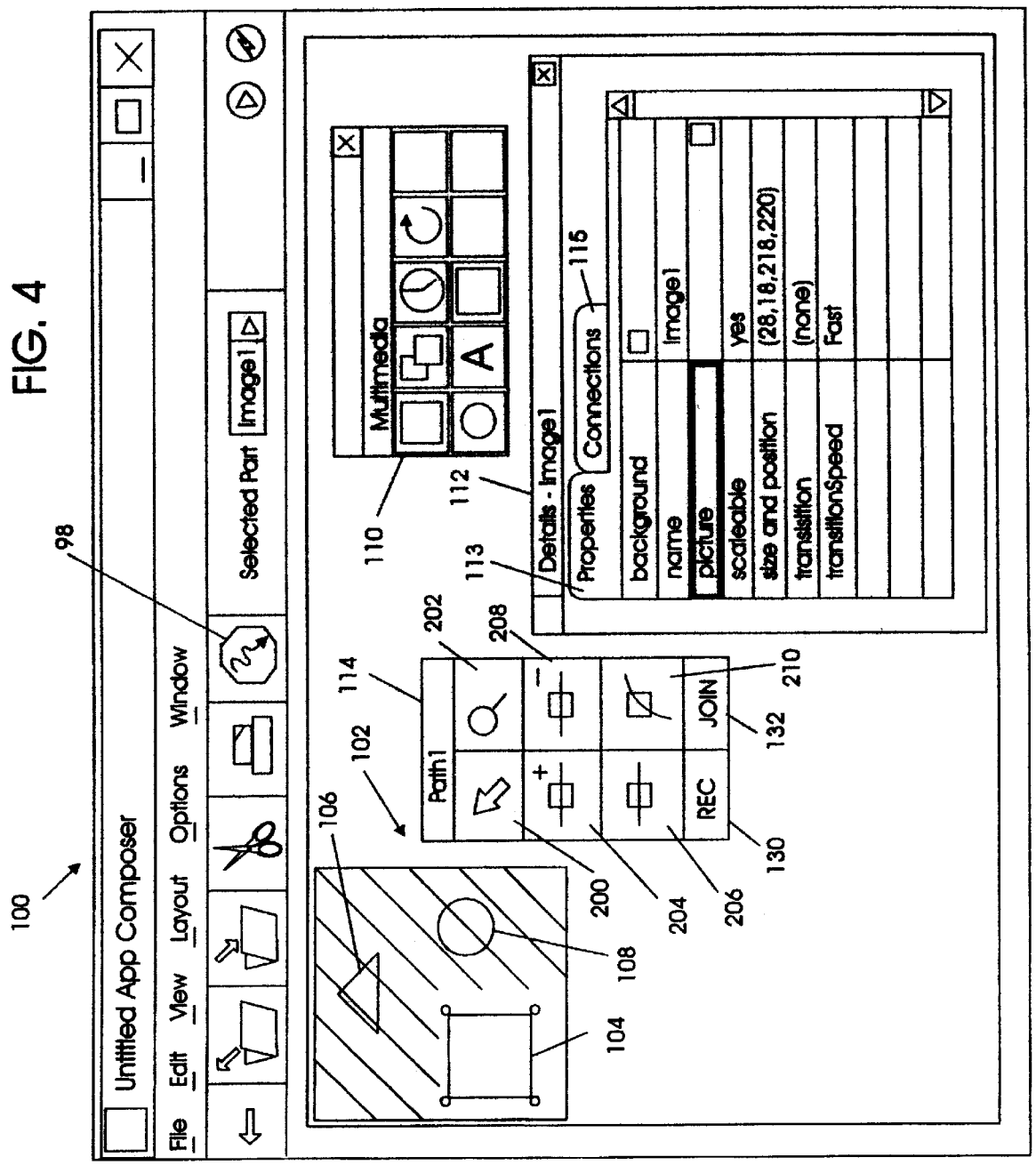

Referring to FIG. 4, the user has selected an object, for example, the square 104, to which a path will be assigned. As shown in FIG. 4, the square 104 has become unghosted (shown without diagonal lines). There are two methods for creating the motion path for square 104. First, the user can press the record push-button 130, and while holding the mouse button down, drag the square 104 manually in the layout area 102 to define a path. In the second method, the user can manually define individual points along which the square 104 will follow for its path.

Figure 5:
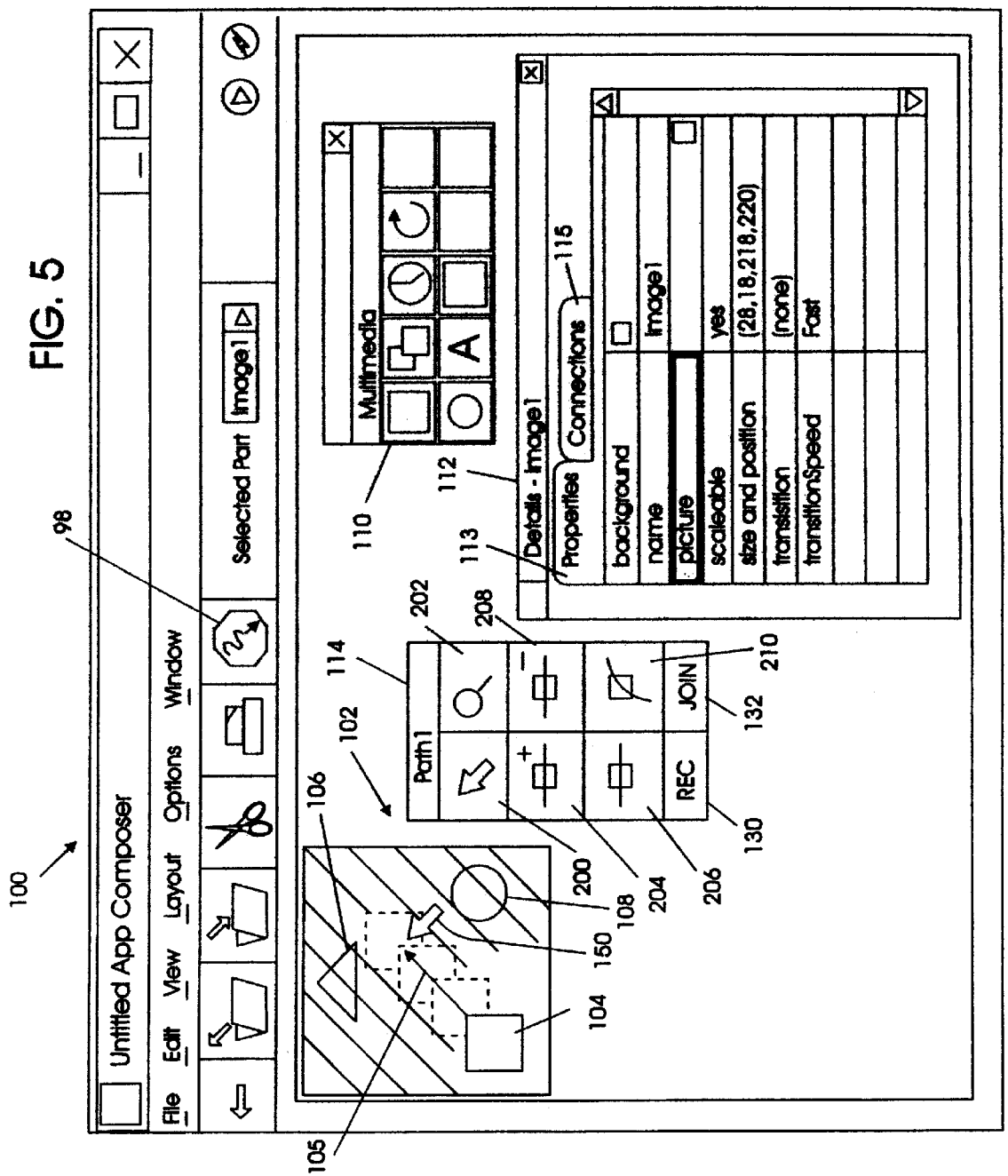

Referring to FIG. 5, an example of the manual drag technique to assign a path is shown. The user presses the Record push-button 130, and then places a cursor 150 over the object to be moved, for example, the square 104, and drags the object along a path (shown as line 105) of the desired movement. When the user has reached the point at which he/she would like the path to end, the user releases the mouse button and the path "record" activity ceases. When set into motion, the square 104 will then move along the path 105 as drawn.

Figure 6:
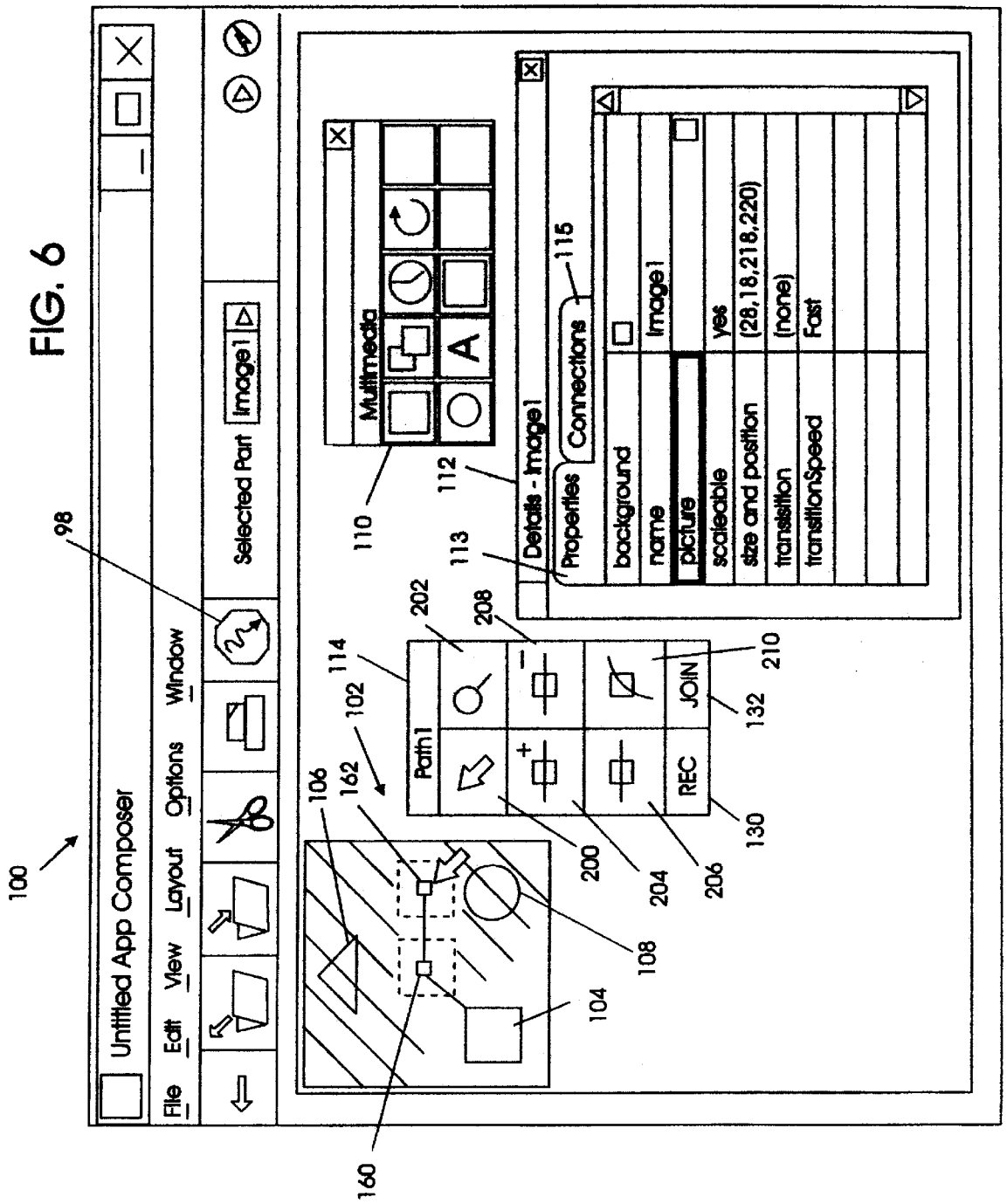
FIG. 6 illustrates use of the present invention to define a path utilizing various anchor points.

Referring to FIG. 6, the setting of anchor points technique is shown. The user can define as many anchor points as desired, for example, anchor point 160 and anchor point 162 with the initial anchor point defined as the physical center (not shown) of the object. A connecting line is automatically drawn between anchor points as each subsequent anchor point is defined. To indicate the end of the path, the user double-clicks the mouse at the location of the end point, this action completes the path. When set in motion, the object (square 104) will then move along the path as defined by the anchor points.

Figure 7:
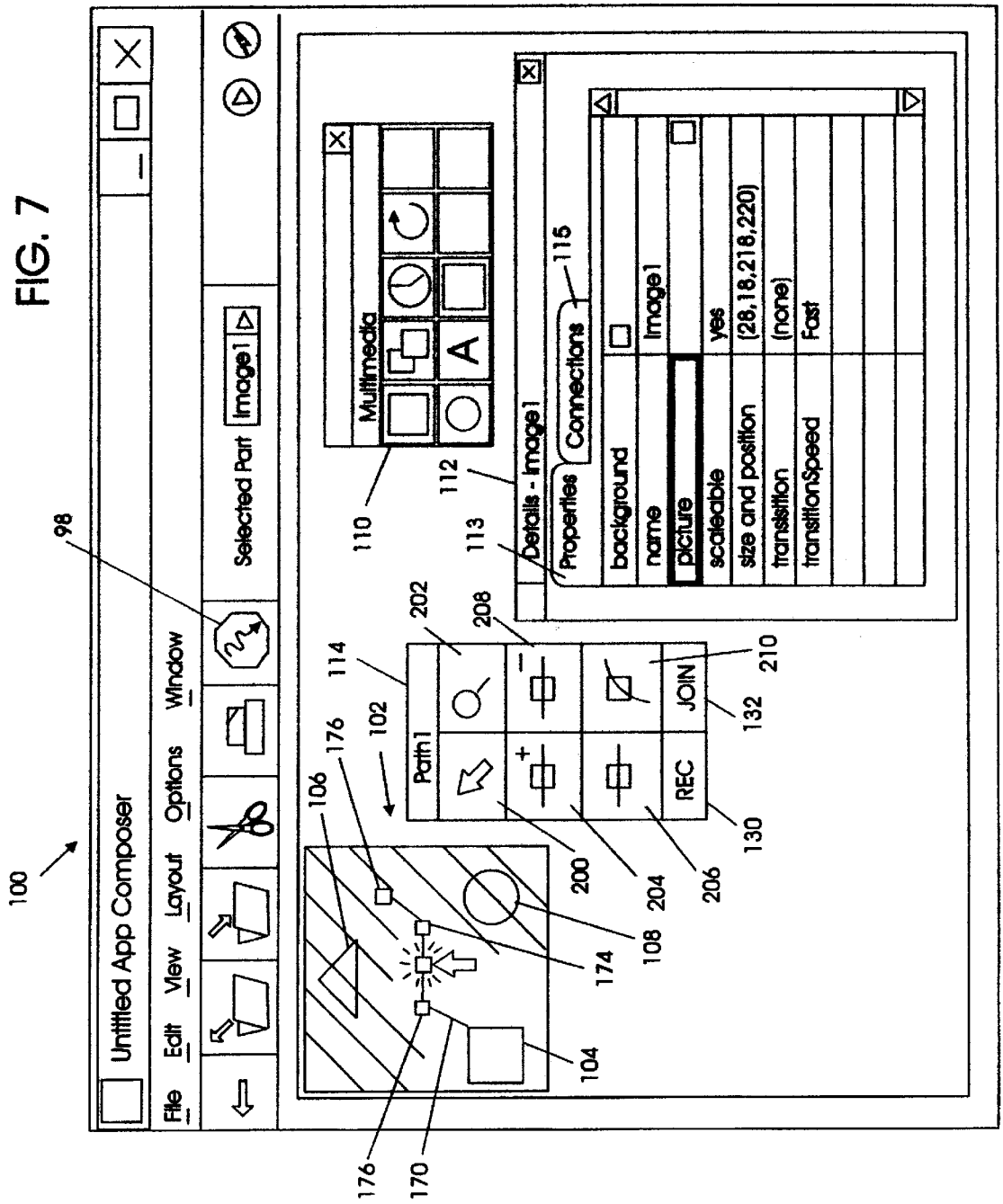
FIG. 7 illustrates the use of the present invention to add or delete an anchor point to a path.

Referring to FIG. 7, having already defined a motion path as identified by line 170 from the square 104 through anchor points 172, 174 and 176, the user decides that the path 170 needs to be modified. To add a point on the path 170, the user selects an anchor point "Add" tool 204 from the path editor window 114 and moves the cursor 150 over the desired location for a new anchor point 171 and presses the mouse button. This adds the new anchor point 171 on the path 170. To delete an existing point from the path 170, the user selects the anchor point "Delete" tool 208 from the path editor window 114, moves the cursor 150 over the existing point to be deleted and presses the mouse button. This deletes the indicated anchor point from the path 170.

Figure 8:
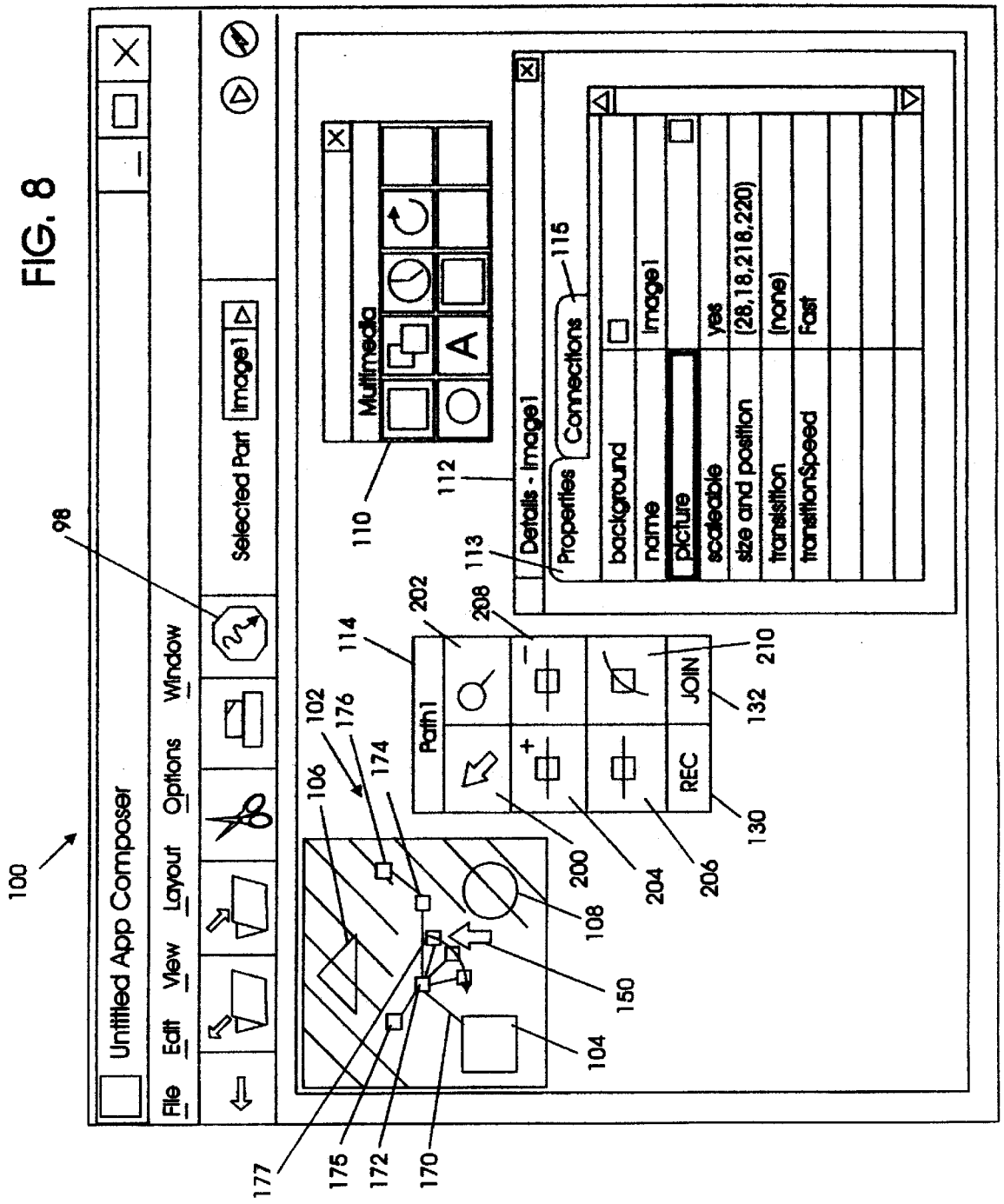
FIG. 8 illustrates use of the present invention to define a curved path.

Referring to FIG. 8, a technique for curving a path is illustrated. The user defines a curve by simply holding and dragging the mouse as the anchor point is being laid, producing an anchor point with two handles 175 and 177 which the user can define and smooth the curve (as shown, handle 177 is dragged "clockwise"). Alternatively, the user can select the anchor point and press an anchor point "curve point" tool 210 in the path editor window 114. Similarly, to make a curve point anchor point into a straight line anchor point, the user can select the curve point anchor point on the layout area 102 and press an anchor point "straight line" tool 206 on the path editor window 114.

Figure 9:
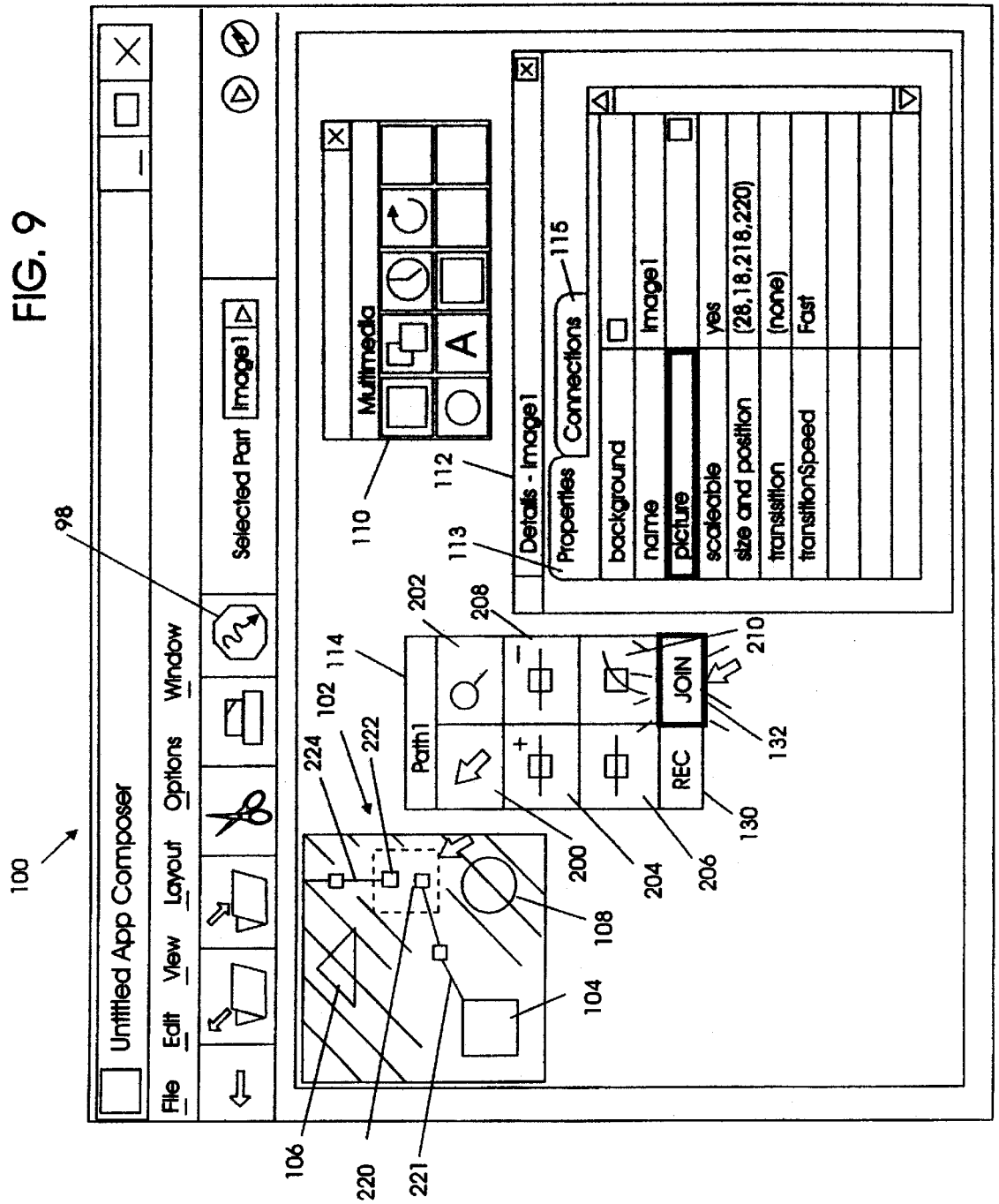
FIG. 9 illustrates the use of the present invention to join a predefined and stored path to a newly created path.

Referring to FIG. 9, a technique is illustrated for joining two or more movement paths . Any two or more paths can be joined by selecting an end anchor point, for example, anchor point 220, of a first path 221 to be joined and an end anchor point 222 of a second path 224 and pressing the "Join" button 132 on the path editor window 114. A position of the two points is averaged in both a horizontal and a vertical direction and one point is created from the two at the resulting position. The user can also select the two anchor points (points 220 and 222) to be joined by clicking the mouse and dragging a dynamically sized box around the two points and pressing the "Join" button 132 on the path editor window 114.

Thus the present invention offers strong advantages over traditional motion path editors. As described herein, the present invention allows the definition of a true-scale path without requiring the use of a separate path editor dialog. Also provided herein are easy to use methods for path (including curved paths) construction, modification, and joining.

Although the present invention has been described with respect to a specific preferred embodiment thereof, various changes and modifications may be suggested to one skilled in the art and it is intended that the present invention encompass such changes and modifications as fall within the scope of the appended claims.

What is claimed is:

1. A method of defining a movement path of a multimedia object in an application development environment, comprising the steps of:

placing a multimedia object in a layout area of the application development environment;

graphically specifying a plurality of movement paths within said layout area for said object with a pointing device without the need to enter a separate layout editor in an area separate from said layout area;

displaying the specified plurality of movement paths in the layout area; and graphically revising the specified plurality of movement paths displayed in the layout area by joining at least two of the plurality of movement paths to provide a single movement path for the object; wherein the step of joining comprises averaging the positions of two corresponding points on the at least two paths so as to provide a third point which joins the at least two paths.

2. The method of claim 1, wherein said step of specifying further comprises:

dragging said object along said movement path with said pointing device.

3. The method of claim 1, wherein said step of specifying further comprises:

selecting individual points with said pointing device which will define said movement path.

4. The method of claim 3, further comprising the step of:

adding additional points to said path after said path has been defined.

5. The method of claim 3, further comprising the step of:

deleting points from said path after said path has been defined.

6. A system for defining a movement path of a multimedia object in an application development environment, comprising:

means for placing a multimedia object in a layout area of the application development environment;

means for graphically specifying a plurality of movement paths within said layout area for said object with a pointing device without the need to enter a separate layout editor in an area separate from said layout area;

means for displaying the specified plurality of movement paths in the layout area; and means for graphically revising the specified plurality of movement paths displayed in the layout area by joining at least two of the plurality of movement paths to provide a single movement path for the object, wherein the step of joining comprises averaging the positions of two corresponding points on the at least two paths so as to provide a third point which joins the at least two paths.

7. The system of claim 6, wherein said means for specifying further comprises:

means for dragging said object along said movement path with said pointing device.

8. The system of claim 6, wherein said means for specifying further comprises:

means for selecting individual points with said pointing device which will define said movement path.

9. The system of claim 8, further comprising:

means for adding additional points to said path after said path has been defined.

10. The system of claim 8, further comprising:

means for deleting points from said path after said path has been defined.

11. A computer program product recorded on a computer readable medium for defining a movement path of a multimedia object in an application development environment, comprising:

computer readable means for placing a multimedia object in a layout area of the application development environment;

computer readable means for graphically specifying a plurality of movement paths within said layout area for said object with a pointing device without the need to enter a separate layout editor in an area separate from said layout area;

computer readable means for displaying the specified plurality of movement paths in the layout area; and computer readable means for graphically revising the specified plurality of movement paths displayed in the layout area by joining at least two of the plurality of movement paths to provide a single movement path for the object, wherein the step of joining comprises averaging the positions of two corresponding points on the at least two paths so as to provide a third point which joins the at least two paths.

12. The program product of claim 11, wherein said computer readable means for specifying further comprises:

computer readable means for dragging said object along said movement path with said pointing device.

13. The program product of claim 11, wherein said computer readable means for specifying further comprises:

computer readable means for selecting individual points with said pointing device which will define said movement path.

14. The program product of claim 13, further comprising:

computer readable means for adding additional points to said path after said path has been defined.

15. The program product of claim 13, further comprising:

computer readable means for deleting points from said path after said path has been defined.

* * * * *